(12) United States Patent
Smith et al.

(10) Patent No.: US 7,328,824 B2
(45) Date of Patent: Feb. 12, 2008

(54) CROSSBAR TOWER ASSEMBLY FOR A VEHICLE RACK

(75) Inventors: Timothy C. Smith, McKinleyville, CA (US); Joseph J. Settelmayer, Fieldbrook, CA (US)

(73) Assignee: Yakima Products, Inc., Beaverton, OR (US)

( * ) Notice: Subject to any disclaimer, the term of this patent is extended or adjusted under 35 U.S.C. 154(b) by 0 days.

(21) Appl. No.: 11/132,702

(22) Filed: May 18, 2005

(65) Prior Publication Data

US 2006/0049324 A1    Mar. 9, 2006

Related U.S. Application Data

(60) Provisional application No. 60/572,589, filed on May 18, 2004.

(51) Int. Cl.
B60R 9/00 (2006.01)

(52) U.S. Cl. ........................ 224/326; 224/309

(58) Field of Classification Search ............... 224/326, 224/322, 325, 329, 331; 70/379 R, 380; 292/246, 154, 302–305
See application file for complete search history.

(56) References Cited

U.S. PATENT DOCUMENTS

| | | | |
|---|---|---|---|
| 4,245,764 A * | 1/1981 | Kowalski et al. | 224/321 |
| 4,496,089 A * | 1/1985 | Eklund | 224/329 |
| 4,640,450 A * | 2/1987 | Gallion et al. | 224/331 |
| 4,809,943 A | 3/1989 | Taschero | |
| 4,993,615 A | 2/1991 | Arvidsson | |
| 4,995,538 A * | 2/1991 | Marengo | 224/329 |
| 5,014,893 A * | 5/1991 | Morley et al. | 224/321 |
| 5,038,988 A | 8/1991 | Thulin | |
| 5,104,019 A * | 4/1992 | Bott | 224/324 |
| 5,104,020 A | 4/1992 | Arvidsson | |
| 5,170,920 A * | 12/1992 | Corrente et al. | 224/321 |
| 5,366,128 A | 11/1994 | Grim | |
| 5,452,831 A * | 9/1995 | Linnhoff | 224/329 |
| 5,492,258 A * | 2/1996 | Brunner | 224/321 |
| 5,556,221 A * | 9/1996 | Brunner | 224/321 |
| 5,730,343 A | 3/1998 | Settelmayer | |
| 5,794,826 A * | 8/1998 | Cronce et al. | 224/321 |
| 5,845,828 A * | 12/1998 | Settelmayer | 224/321 |
| 5,865,356 A | 2/1999 | Arvidsson | |
| 5,871,190 A | 2/1999 | Henriksson | |
| 5,979,723 A * | 11/1999 | Tress et al. | 224/326 |
| 5,988,471 A | 11/1999 | Lundgren | |
| 6,010,048 A | 1/2000 | Settelmayer | |
| 6,116,486 A | 9/2000 | Lindell | |

(Continued)

FOREIGN PATENT DOCUMENTS

IT    EP1072470 A2 *    5/2001

*Primary Examiner*—Nathan Newhouse
*Assistant Examiner*—Margaret Olson
(74) *Attorney, Agent, or Firm*—Kolisch Hartwell, P.C.

(57) ABSTRACT

A tower device for supporting a crossbar over the roof of a vehicle includes a tower body, a clip retention mechanism and a clip selected to adapt to a particular vehicle profile. Various mechanisms may be used to secure the clip to the clip receiving mechanism. For example, a lock body may insert through coinciding apertures in a clip and clip receiver. A spring retainer may slide into slots or grooves in the lock body to prevent the lock body from disengaging. Other mechanism employ lock mounts that pivot to swing lock bodies through apertures in the clip and clip receiver.

10 Claims, 5 Drawing Sheets

U.S. PATENT DOCUMENTS 6,305,589 B1 10/2001 Chimenti
6,398,090 B1 * 6/2002 Chimenti .................. 224/321
6,516,985 B1 2/2003 Lundgren
6,641,012 B1 11/2003 Lundgren

* cited by examiner

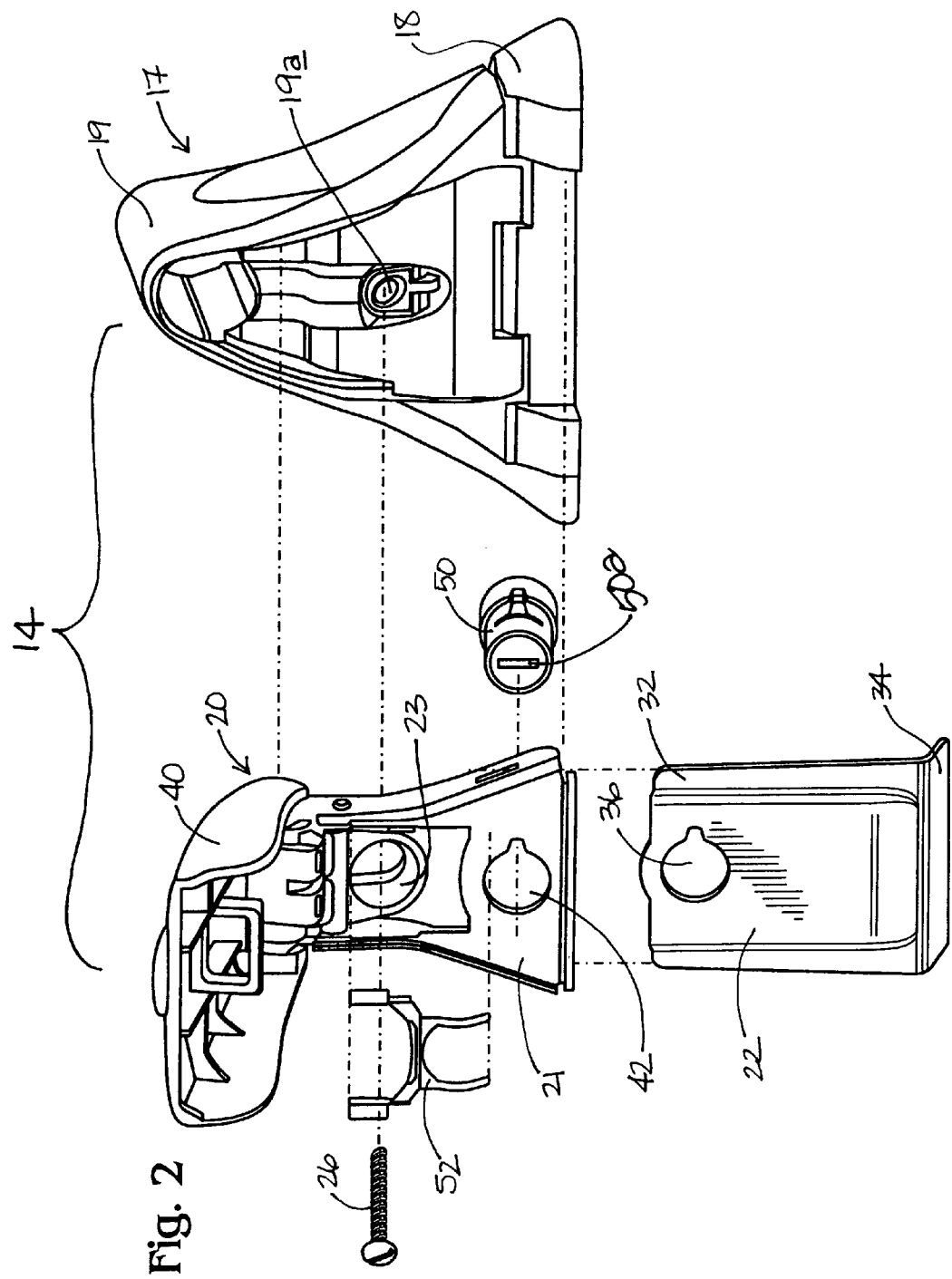

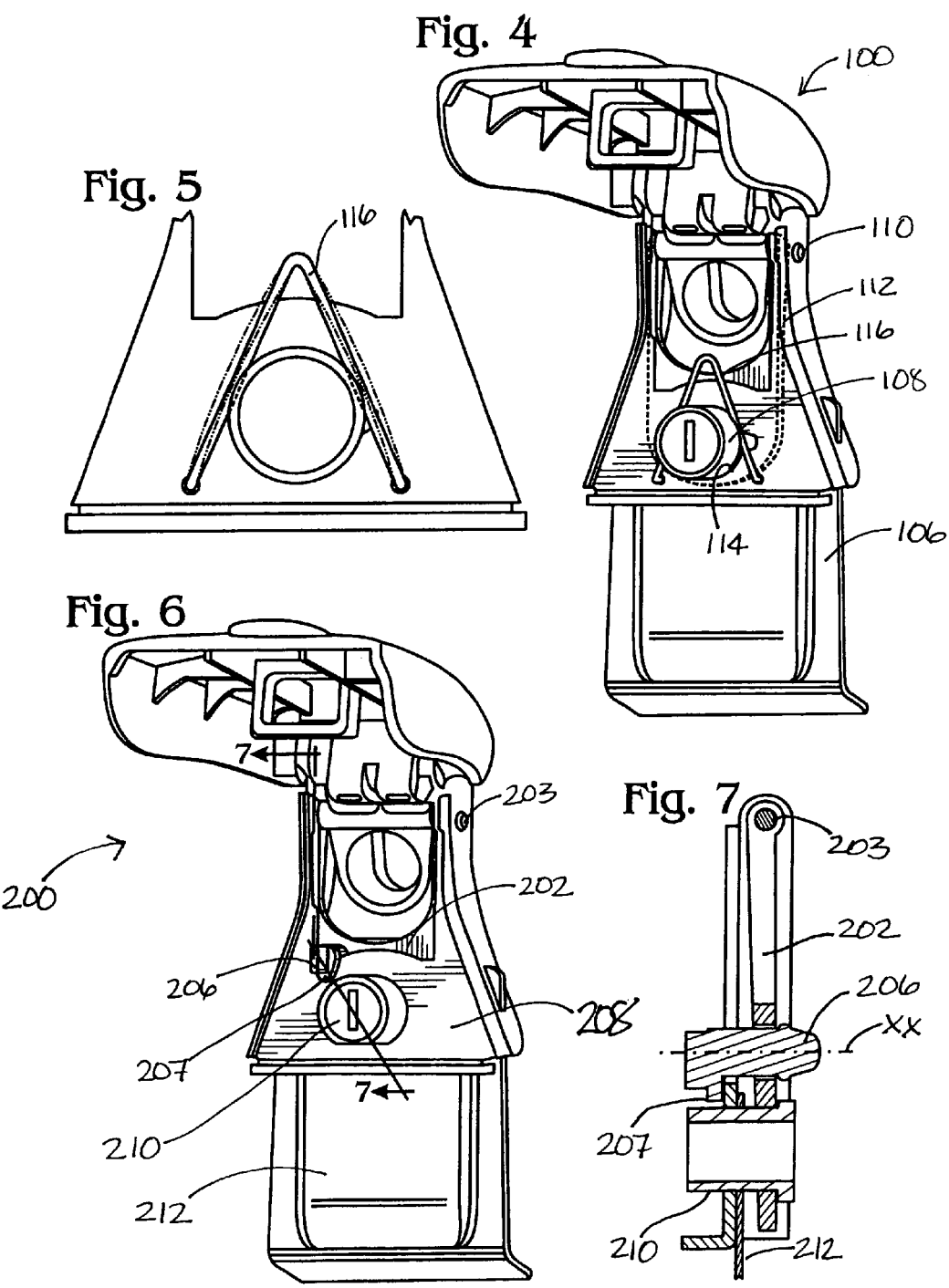

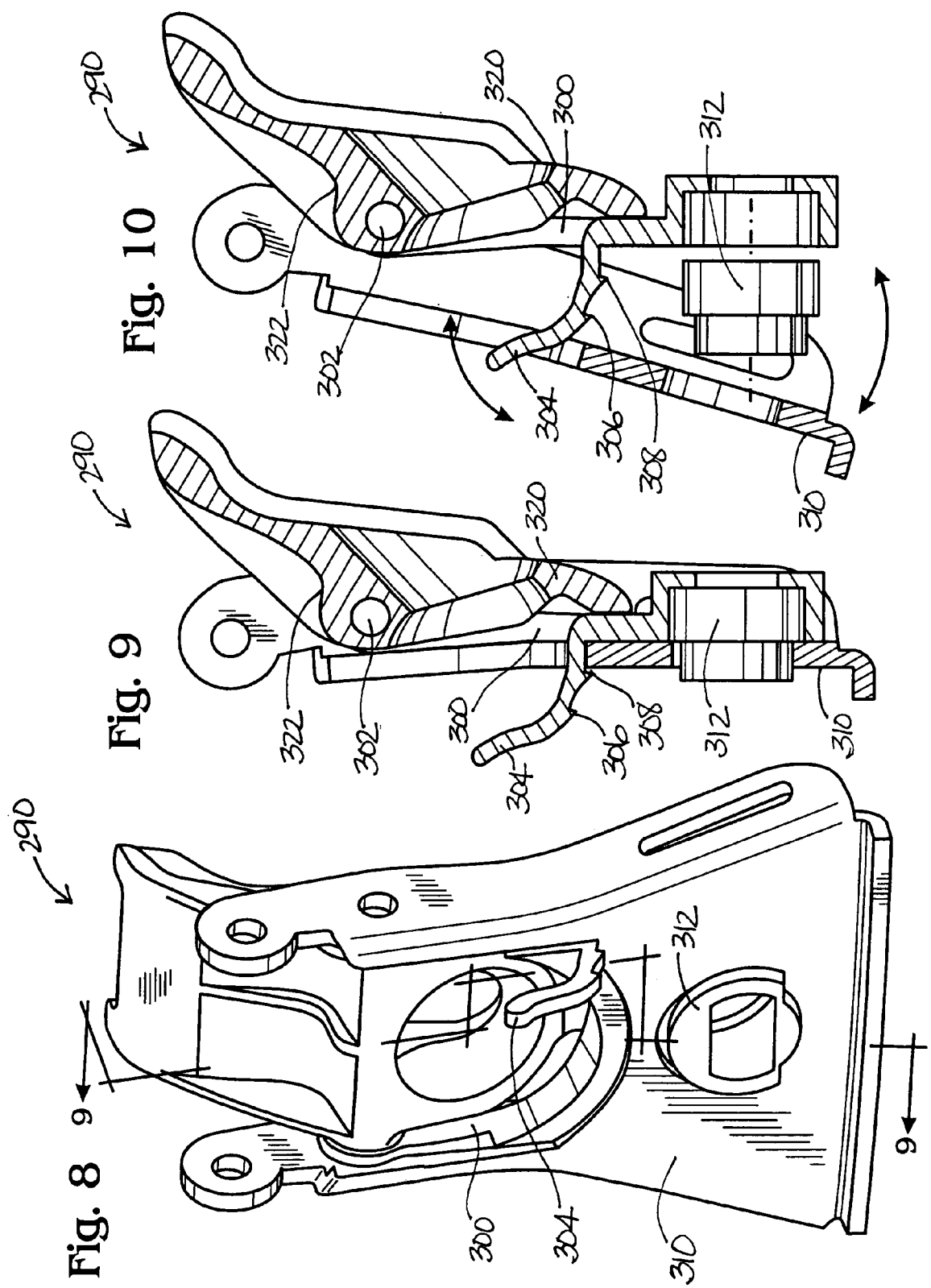

CROSSBAR TOWER ASSEMBLY FOR A VEHICLE RACK

CROSS-REFERENCE TO RELATED APPLICATION

This application is based upon and claims priority under 35 U.S.C. §119 from U.S. Provisional Patent Application Ser. No. 60/572,589 filed May 18, 2004 which is incorporated herein by reference in its entirety for all purposes.

This application also incorporates by reference in their entirety for all purposes the following U.S. Pat. Nos.: 4,496,089; 4,809,943; 4,993,615; 5,038,988; 5,104,020; 5,366,128; 5,366,195; 5,865,356; 5,871,190; 5,988,471; 6,116,486; 6,264,082; 6,305,589; 6,516,985; and 6,641,012

BACKGROUND

Top-mounted vehicle racks provide a versatile platform for transporting bicycles, skis, snowboards, boats, cargo boxes, gear racks, and other items. However, many vehicles do not come equipped with racks that are capable of carrying such a wide range of items. Therefore, many vehicle owners install after market racks. Many such racks include one or more crossbars that extend side-to-side across the top of a vehicle. The crossbars are typically supported on each side of the vehicle's roof by a tower.

To accommodate the variety of vehicles to which racks can be installed, some top-mounted racks include a standard tower design that can be used on a wide range of different vehicle models. Such towers may be configured to cooperate with clips that are specifically designed to fit the tower to a particular vehicle model. This approach works well for consumers, who need only buy vehicle specific clips to fit a standard tower on a variety of different vehicle models. The approach also may decrease cost and/or ease distribution for manufacturers, who do not need to design a tower for every different vehicle model, but rather can provide a common tower design with a variety of relatively simple vehicle specific clips.

Universal tower assemblies are available. However, tower assemblies for accommodating different clips are somewhat complicated to implement and may involve combinations of unassembled parts. The tower design must enable locking of the clip in place when the tower is installed, and should preferably not require complicated combinations of parts or assembly instructions.

SUMMARY

A tower for supporting one end of a crossbar includes a main body for receiving a crossbar, and a clip holder for securing a clip configured for mounting on a particular vehicle profile. The clip holder includes a clip retention mechanism.

BRIEF DESCRIPTION OF THE FIGURES

FIG. 2 shows an exploded view of the tower assembly shown in FIG. 1.

FIGS. 4 and 5 illustrate an alternative clip holder using a modified clip retention mechanism.

FIGS. 6 and 7 show an alternative clip holder using a different clip retention mechanism.

FIGS. 8-10 are perspective and sectional views of an alternative clip holder design.

DETAILED DESCRIPTION

Figure 1:
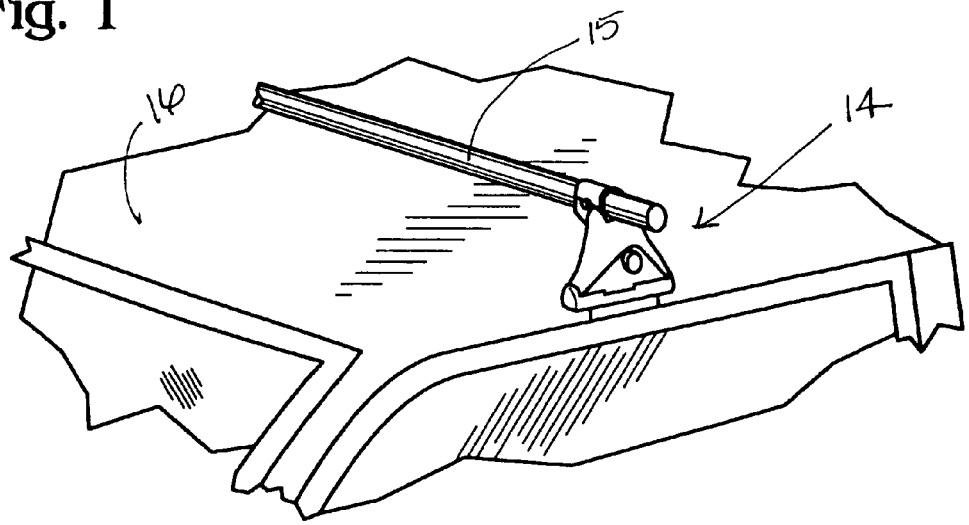
FIG. 1 is a partial perspective view of a vehicle equipped with a roof rack.

FIG. 1 shows an example of a tower assembly 14 configured to support a crossbar 15 above vehicle 16. As shown in FIG. 2, tower assembly 14 includes tower body 17. Tower body 17 has a foot portion 18 that may contact the top of vehicle 16. Tower body 17 also has a bar support portion 19 configured to hold crossbar 15 in place. As shown in FIG. 2, bar support portion 19 has an aperture near the top of tower body 17 through which crossbar 15 passes. In other embodiments, the tower body may include virtually any other arrangement for holding a crossbar in place. Tower body 12 also includes a threaded receiver 19a, or similar device, for securing clip retention mechanism 20 to tower body 17. Clip retention mechanism 20 includes a clip receiver 21 configured to receive clip 22 that has been specifically designed to make tower body 17 compatible with a particular vehicle model. Clip retention mechanism 20 includes a bolt seat 23 through which a bolt 26 may be positioned and screwed into threaded receiver 19a of tower body 17, thus securing clip retention mechanism 20 to tower body 17. Clip retention mechanism 20 may be secured to tower body 17 in any suitable way, and threaded bolt 26 is provided as a nonlimiting example.

Figure 3:
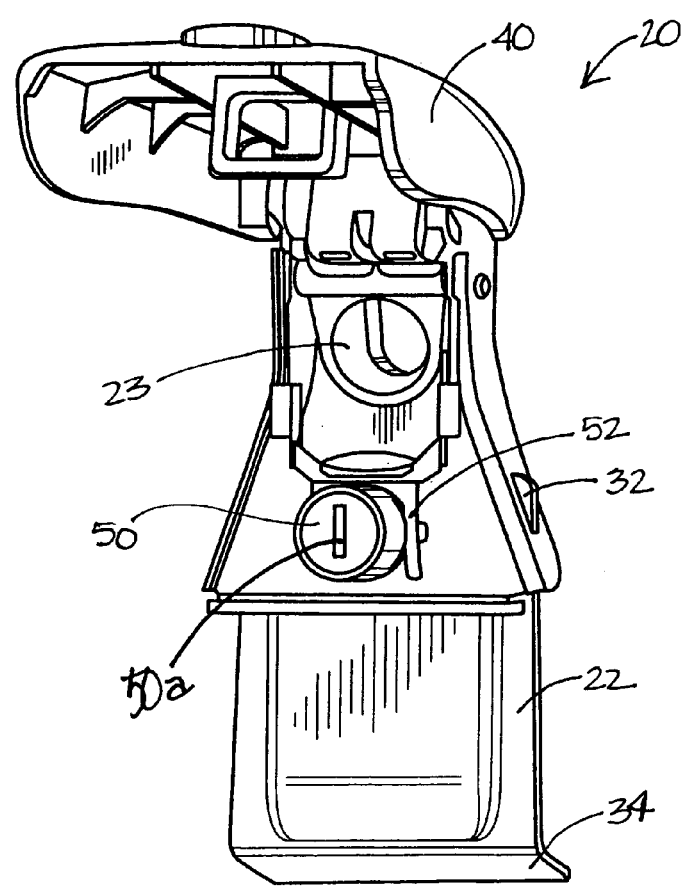
FIG. 3 is a perspective view of a clip holder portion of the tower assembly shown in FIG. 2.

As shown in FIGS. 2 and 3, clip 22 includes a tower interface portion 32, vehicle interface portion 34, and aperture 36. Clip 22 is configured to hold the tower body to a particular vehicle model. A variety of different clips may be produced so that the tower may work with a corresponding variety of different vehicle models. Tower interface portion 32 of clip 22 is substantially the same on all clips so that all clips may be used with a common tower design. Vehicle interface portion 34 of each clip may be individually configured to fit a particular vehicle model. FIG. 3 shows how clip retention mechanism 20 may be secured to tower body 17. As shown, clip retention mechanism 20 receives clip 22. Cover portion 40 folds down to cover clip retention mechanism 20.

Clip 22 may be inserted into clip retention mechanism 20 so that aperture 36 of the clip is aligned with aperture 42 of clip retention mechanism 20. Lock insert 50 may be selectively positioned through the aligned apertures, thus effectively holding clip 22 in clip retention mechanism 20. As shown in FIGS. 2 and 3, lock insert 50 has a slot 50a for receiving a key. A fastener 52 may be slid around lock insert 50, thus holding lock insert 50 in place. Lock insert 50 may include divots or slots on its base for receiving and retaining fastener 52. Fastener 52 is adapted to slide along clip retention mechanism 20 in an integrated fashion so that fastener 52 is automatically aligned to engage lock insert 50. Integrating fastener 52 with clip retention mechanism 20 virtually eliminates the chance that the fastener will be lost and simplifies the installation process.

Other types of fasteners may be used to secure a lock insert in place. Fastener 52 is provided only as a nonlimiting example. Other examples are illustrated and described below. To aid alignment and/or prevent loss of the fastener, some fasteners may be integrated into the lock insert and other fasteners can be integrated into the clip retention mechanism. Furthermore, lock insert 50 is provided as a nonlimiting example of a structure that may be used to hold the clip in the clip retention mechanism. Other structures may be used. A lock insert or similar structure can be a free component, as shown in FIGS. 2 and 3, or the lock insert may be integrated into the clip retention mechanism.

FIGS. 4 and 5 show another embodiment of a clip retention mechanism 100 for a tower assembly configured to support a crossbar above a vehicle. Similar to the embodiment of FIGS. 2 and 3, clip retention mechanism 100 receives clip 106. Lock insert 108 is an integrated component that pivots about hinge 110 on a lock mount 112. Lock mount 112 is configured to automatically direct lock insert 108 into aperture 114 of clip retention mechanism 100. Clip retention mechanism 100 includes fastener 116 that fits over lock insert 108, fitting into grooves, slots, or divots, thus holding lock insert 108 in place and securing clip 106 in an engaged relationship with clip retention mechanism 100. As illustrated, fastener 116 is a resilient wire sized to tightly engage lock insert 108. Lock insert 108 may include one or more recesses to "catch" fastener 116 when it fits over lock insert 108. It should be understood that fastener 52, or any other suitable fastener, could be used with this embodiment. Similarly, fastener 116 could be used with the clip retention mechanism of FIGS. 2 and 3.

FIGS. 6 and 7 show another example of a clip retention mechanism 200 for use with a tower assembly that is configured to support a crossbar above a vehicle. This embodiment includes lock mount 202 that pivots on hinge 203, similar to the embodiment shown in FIGS. 4 and 5. FIG. 7 shows a portion of lock mount 202 that is adapted to receive a fastener 206. Fastener 206 may be dialed or rotated around axis XX. Fastener 206 has a knob or protrusion 207. When protrusion 207 extends over the edge of clip receiver 208, then lock mount 202 is prevented from pivoting away from clip receiver 208, thus retaining lock insert 210 in coinciding apertures of clip 212 and clip receiver 208, thereby securing coupled engagement between clip retention mechanism 200 and clip 212. Similar concepts may be implemented in a variety of ways, and the illustrated embodiment is provided as a nonlimiting example. For example, instead of a fastener that rotates on a portion of the lock mount, a fastener that slides on a portion of the lock mount could be used.

FIGS. 8-10 show an embodiment that is similar to the ones shown in FIGS. 4-7. Clip retention mechanism 290 includes lock mount (plastic carrier) 300 that pivots on hinge 302. Resilient fastener (finger) 304 is connected to lock mount 300. Finger 304 includes two barbs 306 and 308 that serve to hold the lock mount in two different positions. When barb 306 is indexed against clip receiver 310, lock mount 300 is held away from clip receiver 310 with lock insert 312 clear of the aperture. In this position, a clip may be received by clip receiver 310. When barb 308 is indexed against clip receiver 310, then lock mount 300 is held near clip receiver 310 with lock insert 312 extending through the apertures in the clip (not shown) and clip receiver 310, thus holding the clip securely fastened to the tower.

FIGS. 9 and 10 show how follower 320 may be used to hold lock mount 300 in place. Follower 320, or a similar mechanism, helps hold lock insert 312 through the aperture in clip receiver 310, thus retaining a clip in a received position. Follower 320 can be moved and held in position by a cam mechanism 322 that is activated when a cover (such as 40 of FIGS. 2 and 3) is moved to a closed position. The illustrated follower/cam assembly is provided as a nonlimiting example. It should be understood that such a structure may be used on arrangements other than that shown in FIGS. 8-10.

Figure 13:
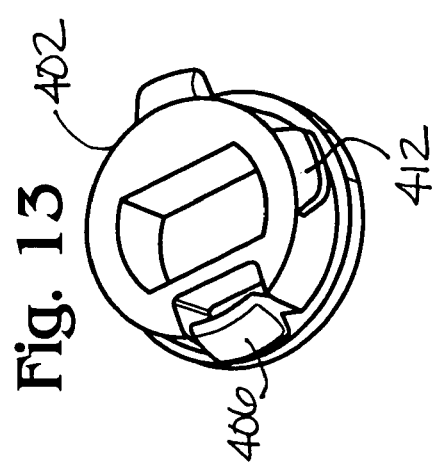
FIG. 13 is a perspective view of a clip insert used in a clip holder assembly shown in FIGS. 11 and 12.
Figure 12:
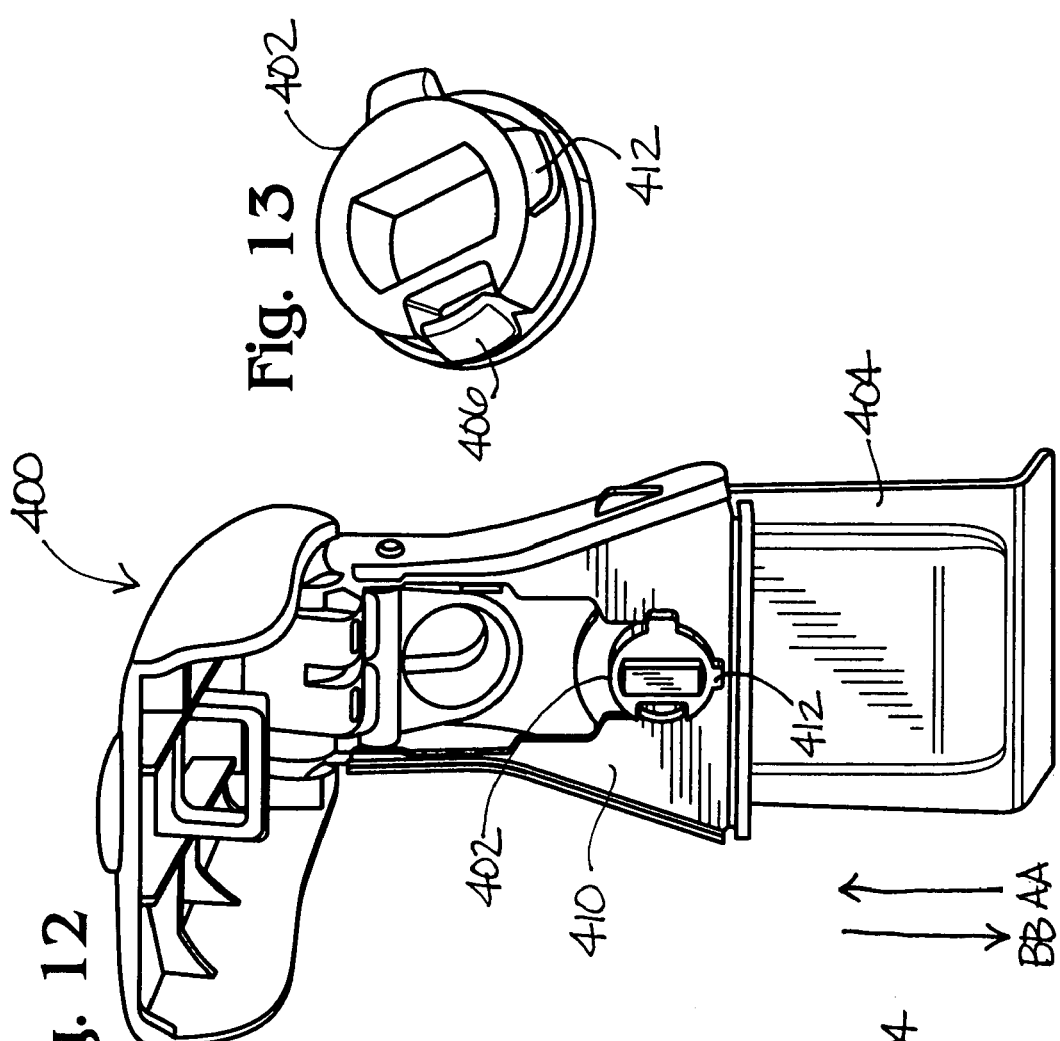
FIGS. 11 and 12 are perspective views of another clip holder design.
Figure 11:
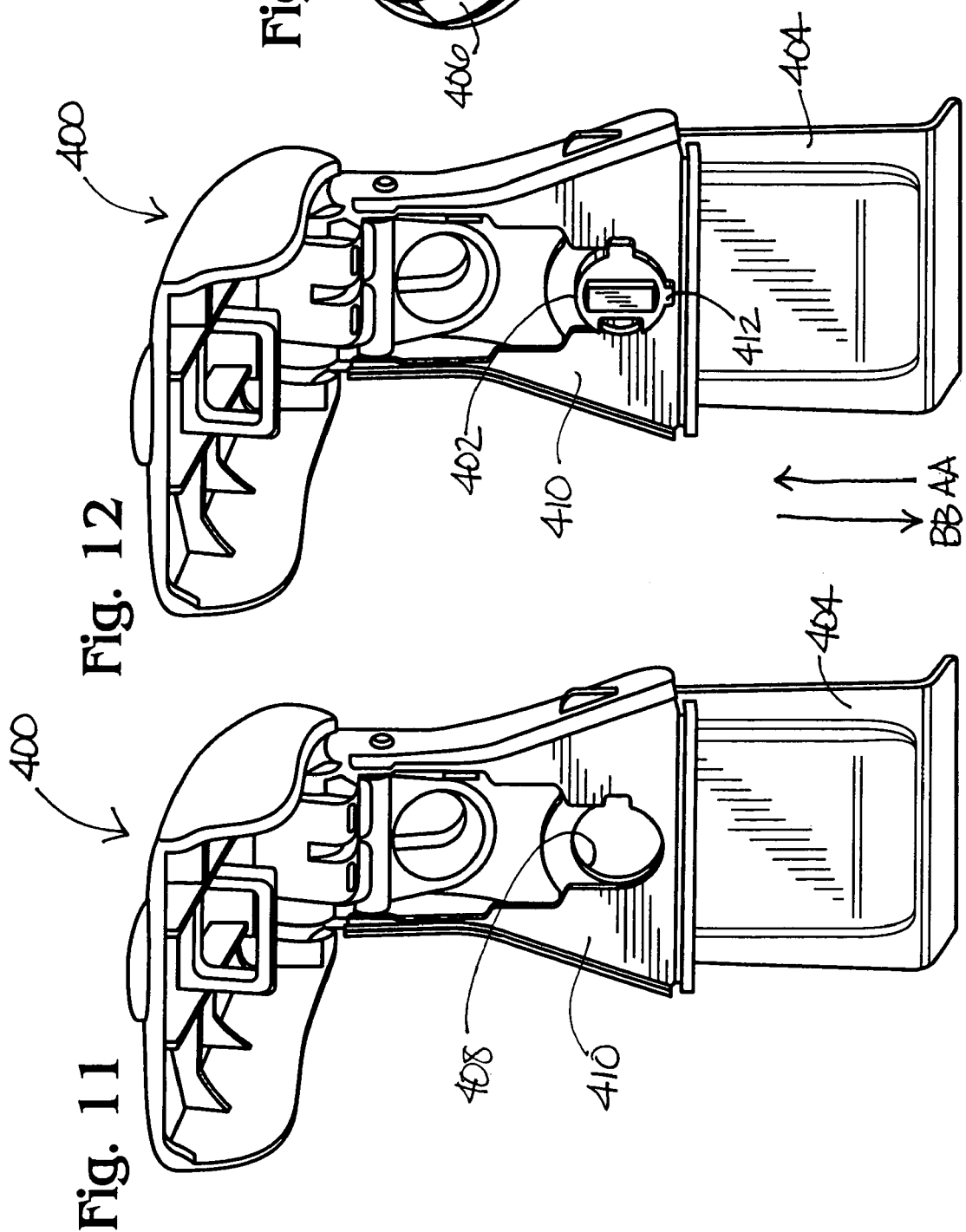

FIGS. 11-13 show another example of a clip retention mechanism 400. Fastener 402 is embodied in the form of a lock insert which may be connected to clip 404. Lock insert 402 includes a cantilevered barb 406 that allows the insert to be pushed through aperture 408 of clip 404. Barb 406 is configured to catch on clip 404 once lock insert 402 is pushed through aperture 408, holding lock insert 402 in place inside of aperture. The clip/lock insert assembly may then be loaded into clip receiver 410 in a first direction AA until the lock insert clears clip receiver 410. The assembly may then be moved in a second direction BB so that tab 412 of fastener 402 effectively catches over an edge of clip receiver 410, thus securing clip 404 in clip receiving mechanism 400.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. A tower assembly configured to cooperate with a clip for securement to a top of a vehicle, comprising:
   a tower body configured to support a crossbar atop the vehicle;
   a clip receiver connected to the tower body, the clip receiver having one or more slots for receiving the clip, wherein the clip and clip receiver have apertures for receiving a lock insert member, so that when the lock insert member extends through the apertures the clip is prevented from disengaging the clip receiver; and
   a fastener being preassembled with the clip receiver and moveable between an engaged position and a disengaged position and being mounted in tracks provided on the clip receiver so the fastener can be selectively slid from the disengaged position to the engaged position,
   wherein the fastener in the engaged position prevents the lock insert member from being removed from the clip and clip receiver, and
   wherein the lock insert member has a pair of slots on opposing lateral sides, the fastener having arms that fit in the slots of the lock insert member when the fastener is in the engaged position.

2. The tower assembly of claim 1, further comprising a lock mount pivotally connected to the clip receiver for carrying the lock insert member, the lock mount swinging the lock insert member through the apertures in the clip and clip receiver.

3. The tower assembly of claim 2, wherein the fastener is in the form of a rotatable dial attached to the lock mount, the fastener having a knob portion for latching over an edge of the clip receiver.

4. The tower assembly of claim 1, wherein the fastener includes a catch that is slideably connected to the clip receiver.

5. The tower assembly of claim 1, wherein the fastener includes a resilient loop pivotably connected to the clip receiver.

6. The tower assembly of claim 1, wherein the lock insert member is key operated.

7. A tower assembly configured to cooperate with a clip for securement to a top of a vehicle, comprising:
- a tower body configured to support a crossbar atop the vehicle;
- a clip receiver connected to the tower body, the clip receiver having one or more slots for receiving the clip, wherein the clip and clip receiver have apertures for receiving an insert member, so that when the insert member extends through the apertures the clip is prevented from disengaging the clip receiver; and
- a fastener being preassembled with the clip receiver and moveable between an engaged position and a disengaged position, wherein the fastener in the engaged position prevents the insert member from being removed from the clip and clip receiver, and further wherein the insert member has a pair of slots on opposing lateral sides, the fastener having arms that fit in the slots of the insert member when the fastener is in the engaged position.

8. The tower assembly of claim 7, wherein the fastener is mounted in tracks provided on the clip receiver so the fastener can be selectively slid from the disengaged position to the engaged position.

9. The tower assembly of claim 7, further comprising a lock mount pivotally connected to the clip receiver for carrying the insert member, the lock mount swinging the insert member through the apertures in the clip and clip receiver.

10. A tower assembly configured to cooperate with a clip for securement to a top of a vehicle, comprising:
- a tower body configured to support a crossbar atop the vehicle;
- a clip receiver connected to the tower body, the clip receiver having one or more slots for receiving the clip, wherein the clip receiver includes an aperture and the clip includes a corresponding aperture that aligns with the aperture of the clip receiver when the clip is received by the clip receiver, and wherein the clip receiver includes an insert mount configured to position an insert member through the aligned apertures; and
- a fastener connected to the clip receiver and being moveable between an engaged position and a disengaged position, wherein the fastener in the engaged position prevents the insert member from being removed from the clip and clip receiver, and further wherein the insert member has a pair of slots on opposing lateral sides, the fastener having arms that fit in the slots of the insert member when the fastener is in the engaged position.

* * * * *